T. SLAIGHT
Padlock.
No. 216,062.  Patented June 3, 1879.
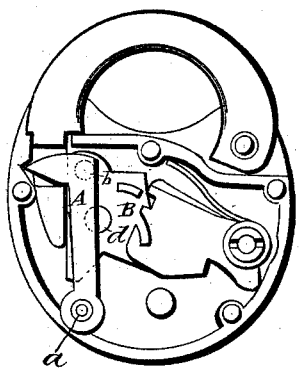
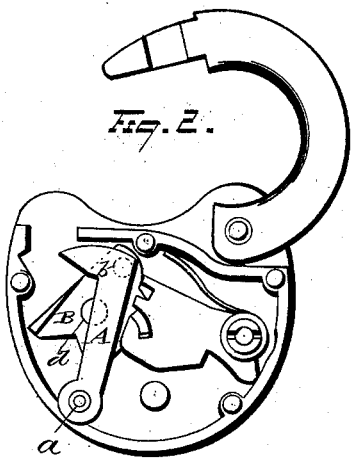
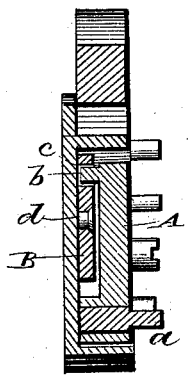
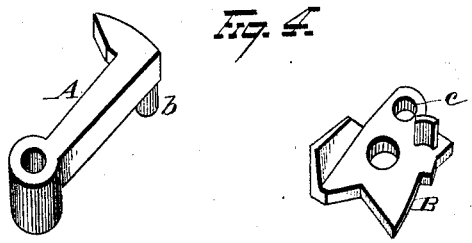
WITNESSES
INVENTOR Thomas Slaight.
By Leggett & Leggett
ATTORNEY

UNITED STATES PATENT OFFICE.

THOMAS SLAIGHT, OF NEWARK, NEW JERSEY.

IMPROVEMENT IN PADLOCKS.

Specification forming part of Letters Patent No. 216,062, dated June 3, 1879; application filed April 7, 1879.

*To all whom it may concern:*

Be it known that I, THOMAS SLAIGHT, of Newark, in the county of Essex and State of New Jersey, have invented certain new and useful Improvements in Padlocks; and I do hereby declare the following to be a full, clear, and exact description of the invention, such as will enable others skilled in the art to which it pertains to make and use it, reference being had to the accompanying drawings, which form part of this specification.

My invention relates to certain improvements in padlocks; and consists in the parts and combination of parts hereinafter described and claimed.

In the drawings, Figure 1 is a view of the interior of a lock embodying the invention, the same being shown with the face-plate of the casing removed and the parts as locked. Fig. 2 represents said lock with the parts unlocked. Fig. 3 is a sectional view lengthwise through the dog. Fig. 4 represents, in detail, the pivotal plate and the locking-dog.

The dog A is pivoted at its lower extremity to the lock-casing, as shown at $a$, and has the inner face of its upper extremity formed with a right-angular stud, $b$, which latter works as a pivot within a corresponding hole, $c$, made in the pivotal plate B. This plate is pivoted at $d$ to the lock-casing, and is made in an independent piece from the dog, so that the dog has free lateral bearing against the contiguous face of said plate, and moves over the same in the operation of the lock.

It is apparent that, instead of forming the stud $b$ integral with the upper extremity of the dog, a similar stud could be formed on the plate and work as a pivot within a corresponding hole made in the dog; or said dog and plate could be connected together by a pivot formed independently of both the same.

The upper and lower extremities of the dog are respectively pivoted at such points that when the dog is in engagement with the shackle, the straight line which joins the centers of said pivotal points is between the locking end of the shackle and the center of the pivot by which the plate B is secured to the lock-casing.

All force imposed upon the dog by the shackle as the latter is attempted to be drawn therefrom is borne by the dog and pivotal plate without imparting the same in any measure to the tumblers. Hence the advantage of my improvement is readily seen, in that it relieves the tumblers from any strain brought to bear against the parts when locked.

It will therefore be apparent that, even if the tumblers should be removed from the lock, the shackle would not only be still held as firmly in engagement with the dog, but the latter only be drawn forward in any attempt to break such engagement.

It will be observed that the parts are adapted to operate so that when the dog is withdrawn from engagement with the shackle the latter is thrown out by engagement of the rotary plate therewith.

The tumblers and other features of the lock not specifically described may be of any suitable construction, and I prefer them to be made as illustrated in the drawings.

Having fully described my invention, what I claim as new, and desire to secure by Letters Patent, is—

1. In a padlock, the combination, with the pivotal plate, of the independent dog, whose opposite extremities are pivoted, respectively, to said plate and the lock-casing, the same being arranged so that upon removal of the tumblers any strain upon the shackle throws the dog forward and prevents the lock from being opened, substantially as set forth.

2. In a padlock, the combination of the dog and the pivotal plate, made independent of each other, and pivoted together at their upper extremities, substantially as set forth.

3. In a padlock, the combination, with the dog, whose lower extremity is pivoted to the lock-casing, of the independent pivotal plate, against the face of which the dog has lateral bearing, the upper extremities of said dog and plate being pivoted together, substantially as set forth.

In testimony that I claim the foregoing 1 have hereunto set my hand this 4th day of April, 1879.

THOMAS SLAIGHT.

Witnesses:
W. B. EGGERS,
JAMES F. BOND.